United States Patent [19]
Wang

[11] Patent Number: 5,843,395
[45] Date of Patent: *Dec. 1, 1998

[54] PROCESS FOR HYDROGEN PRODUCTION FROM HYDROGEN SULFIDE DISSOCIATION

[76] Inventor: Chi S. Wang, 5923 Fairmont, Woodridge, Ill. 60517

[ * ] Notice: The term of this patent shall not extend beyond the expiration date of Pat. No. 5,614,156.

[21] Appl. No.: 818,999

[22] Filed: Mar. 17, 1997

[51] Int. Cl.⁶ .............................. C01B 17/04; C01B 3/04
[52] U.S. Cl. ................................ 423/573.1; 423/648.1; 204/157.19; 204/157.52
[58] Field of Search ................ 204/157.49, 157.52; 423/573.1, 648.1, 658.2

[56] References Cited

U.S. PATENT DOCUMENTS

| | | | |
|---|---|---|---|
| 3,856,925 | 12/1974 | Kodera et al. | 423/416 |
| 4,066,739 | 1/1978 | Chen | 423/571 |
| 4,094,962 | 6/1978 | Cocuzza et al. | 423/573 |
| 4,302,434 | 11/1981 | Hellmer et al. | 423/573 |
| 4,461,755 | 7/1984 | Daley et al. | 423/573 |
| 4,481,181 | 11/1984 | Norman | 423/573 |
| 4,695,446 | 9/1987 | Bogdanovic | 423/648 R |
| 4,999,178 | 3/1991 | Bowman | 423/416 |
| 5,211,923 | 5/1993 | Harkness et al. | 423/220 |
| 5,614,156 | 3/1997 | Wang | 422/174 |

FOREIGN PATENT DOCUMENTS

| | | | |
|---|---|---|---|
| 1134596 | 11/1982 | Canada | 423/573.1 |
| 2233278 | 1/1973 | France | 423/573.1 |
| 52052173 | 4/1977 | Japan | 423/573.1 |
| 53130291 | 11/1978 | Japan | 423/658.2 |

OTHER PUBLICATIONS

Zaman, J. and A. Chakma, "A Simulated Study on the Thermal Decomposition of $H_2S$ in a Membrane Reactor", Int. J. Hydrogen Energy, vol. 20, 21–28 (1995).

Woiki, D. and P. Roth, "Kinetics of the High–Temperature $H_2S$ Decomposition," J. Phys. Chem. 98, 12958–12963 (1994).

Kaloidas, V and N. Papayannakos, "Kinetics of Thermal, Non–Catalytic Decomposition $H_2S$," Journal Engineering Science, 44, 2493–2500 (1989).

Edlund, D.J. and W.A. Pledger, "Thermolysis of Hyrogen Sulfide in a Metal–Membrane Reactor," Journal Membrane Science, 77, 255–263 (1993).

Olsen, John C, Unit Processes & Principles of Chemical Engineering D. Van Nostrand & Co NY NY 1932 pp. 1–3.

*Primary Examiner*—Gary P. Straub
*Attorney, Agent, or Firm*—Philip H. Kier

[57] ABSTRACT

A process using high-temperature thermal dissociation to recover hydrogen and salable sulfur from industrial waste streams containing hydrogen sulfide ($H_2S$) is disclosed. Thermal dissociation occurs in a thermoelectric reactor at temperatures up to 1900° C. Waste energy from the high-temperature reactor is recovered and used to preheat the $H_2S$-laden stream before entering the high-temperature reactor. Sulfur is separated out in a condenser. The process also includes a scrubber to eliminate the carryover of liquid sulfur mists or aerosols, and a membrane to separate the hydrogen from the dissociated product stream. Trace amounts of unconverted $H_2S$ are recycled through the process for further dissociation.

7 Claims, 2 Drawing Sheets

PROCESS FOR HYDROGEN PRODUCTION FROM HYDROGEN SULFIDE DISSOCIATION

BACKGROUND OF THE INVENTION

This invention relates to the treatment of wastes containing hydrogen sulfide to recover not only sulfur, but also hydrogen. More particularly, the invention relates to a closed-loop process in which hydrogen sulfide ($H_2S$) is dissociated in a high-temperature thermoelectric reactor with high energy efficiency.

Significant amounts of hydrogen sulfide are produced as waste streams in petroleum refining, natural gas production, coal-based synfuel production, and metals refining. The current standard technology for treating hydrogen sulfide waste uses the Claus chemistry involving mutual reduction/oxidation between sulfur dioxide and hydrogen sulfide to produce water and elemental sulfur. The Claus chemistry has two major drawbacks. One drawback is that one of the products is water ($H_2O$), not hydrogen, which has great value as a pollution-free fuel. The present invention can effectively dissociate hydrogen sulfide in a thermoelectric reactor to produce sulfur and hydrogen in a relatively simple integrated process. Thus, one object of the present invention is to produce hydrogen from the dissociation of hydrogen sulfide. The second drawback is that Claus chemistry requires a second step, in which hydrogen sulfide and unconverted impurities are burned to form sulfur dioxide ($SO_2$) which is then released to the environment. This second step requires additional energy usage and releases pollutant, $SO_2$. The present invention is an integrated closed-loop system, which can recycle the unconverted gas for further destruction and dissociation until completely converted. Thus, another object is to reduce pollution in the treatment of hydrogen sulfide by minimizing unconverted $SO_2$ and its release. The second step of the Claus method requires additional capital to be expended on pollution control equipment for treating the untreated hydrogen sulfide (about 2.5%) and impurities. The present invention eliminates the need for this equipment and thereby fosters use of abundant high-sulfur-content fuels by improving the economics of removal of hydrogen sulfide when such high-sulfur-content fuel is used.

Hydrogen is a pollution-free source of energy. Conventional technology for producing hydrogen is from electrolysis of water. However, electrolysis of water is relatively energy intensive compared with producing hydrogen from the dissociation of hydrogen sulfide. This can be seen from comparing the heat of formation of water, −68.32 kcal/mole, with that of hydrogen sulfide, −4.77 kcal/mole, a reduction of over 90% in the energy required to overcome the heat of formation. Thus, another object of the present invention is to produce hydrogen in an energy-efficient manner. Methods of treating $H_2S$ waste to produce elemental sulfur and hydrogen have been investigated. A thermochemical process is taught by Bowman in U.S. Pat. No. 4,999,178. A method using chemical separation is taught by Chen in U.S. Pat. No. 4,066,739. A method of dissociating hydrogen sulfide is taught by Harkness, et al, in U.S. Pat. No. 5,211,923. In this method, hydrogen sulfide is dissociated in a plasma reactor with microwave energies, and operating in the temperature range of about 150° C. to 450° C. and in the pressure range of about 0.5 atm. to 2.0 atm. However, it might be difficult under industrial practice to achieve plasma conditions in this temperature range and pressure range. For example, the temperature may not be high enough to prevent sulfur from condensing on the reactor wall, shading the energy source and plugging the reactor pathway. Especially, liquid sulfur would prevent light passing through transparent reactor walls from penetrating deep into the interior of the reactor.

The use of higher temperatures in the reactor in the present invention, between 1000° C. and 1900° C., non-equilibrium electromagnetic-hydrodynamics conditions, and seed materials combine to enhance plasma formation and reduce nucleation or condensation of sulfur vapor that might cause formation of sub-micron-sized aerosols in the reactor and operating problems in downstream equipment. By using waste heat recovered from multiple recuperators to preheat the waste stream before entering the reactor, the present invention is energy efficient. The following table compares estimates of energy requirements for a Claus process, a microwave process, and the current system based on a 170 long ton per day (LTD) of hydrogen sulfide treatment in a typical petrochemical plant.

The present invention has the additional benefit of producing elemental sulfur, an important material for many industries. Therefore, another object of the present invention is to recover sulfur from hydrogen sulfide waste steams.

| Technology | Energy Required (MBtu/day) | Energy Savings (MBtu/day) |
|---|---|---|
| Present Invention | 20 | 2280 |
| Claus | 2300 | 0 |
| Microwave | 1560 | 740 |

SUMMARY OF THE INVENTION

The present invention is a closed-loop process to recover salable sulfur and hydrogen gas, a clean fuel, from the thermal dissociation of hydrogen sulfide as contained in industrial waste gases. The process involves preheating the gas waste stream in heat exchangers and then dissociating the hydrogen sulfide in a thermoelectric reactor in which high temperatures are achieved in a well insulated reaction chamber containing electric energy sources. This reactor may apply thermal radiation enhancement, energy trapping, electromagnetic-hydrodynamics (EMHD), and high-technology insulation materials to achieve and maintain a high-temperature environment, between 1000° C. and 1900° C., and to accomplish a high degree of hydrogen sulfide dissociation. In order to initiate the dissociation at lower activated energy levels, seed material may also be added to increase the electrical conductivity of the waste stream and consequently enhance the degree of dissociation.

Heat in the product stream from the high-temperature thermoelectric reactor is recovered for preheating the waste stream in the heat exchangers so that high energy efficiencies are attainable. Sulfur is condensed out of the product stream in an expansion chamber/condenser. Hydrogen is separated by means of a membrane separator. The process includes several steps to remove sulfur from the product stream. These are demisting to remove sulfur-laden mists and aerosols and absorbing sulfur using a water spray in a scrubber. Trace amounts of hydrogen sulfide are separated by the membrane separator and are recycled back through the process. Because the process of the present invention is a closed loop process and because combustion is not used, releases to the environment of polluting sulfur compounds, such a sulfur dioxide ($SO_2$) are nil.

DETAILED DESCRIPTION OF THE PREFERRED EMBODIMENT

Figure 1:
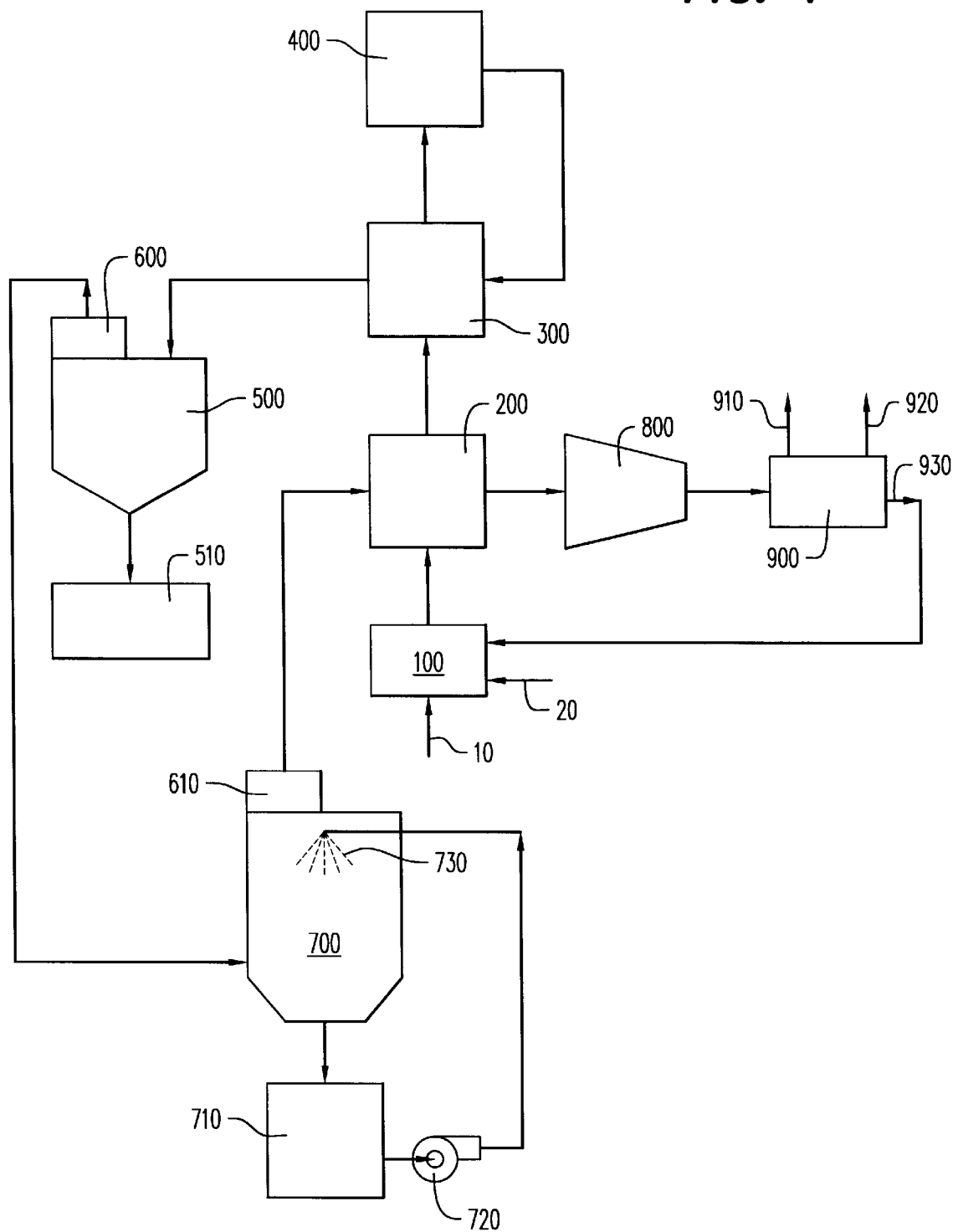
FIG. 1 is a schematic flow diagram of the present invention.
Figure 2:
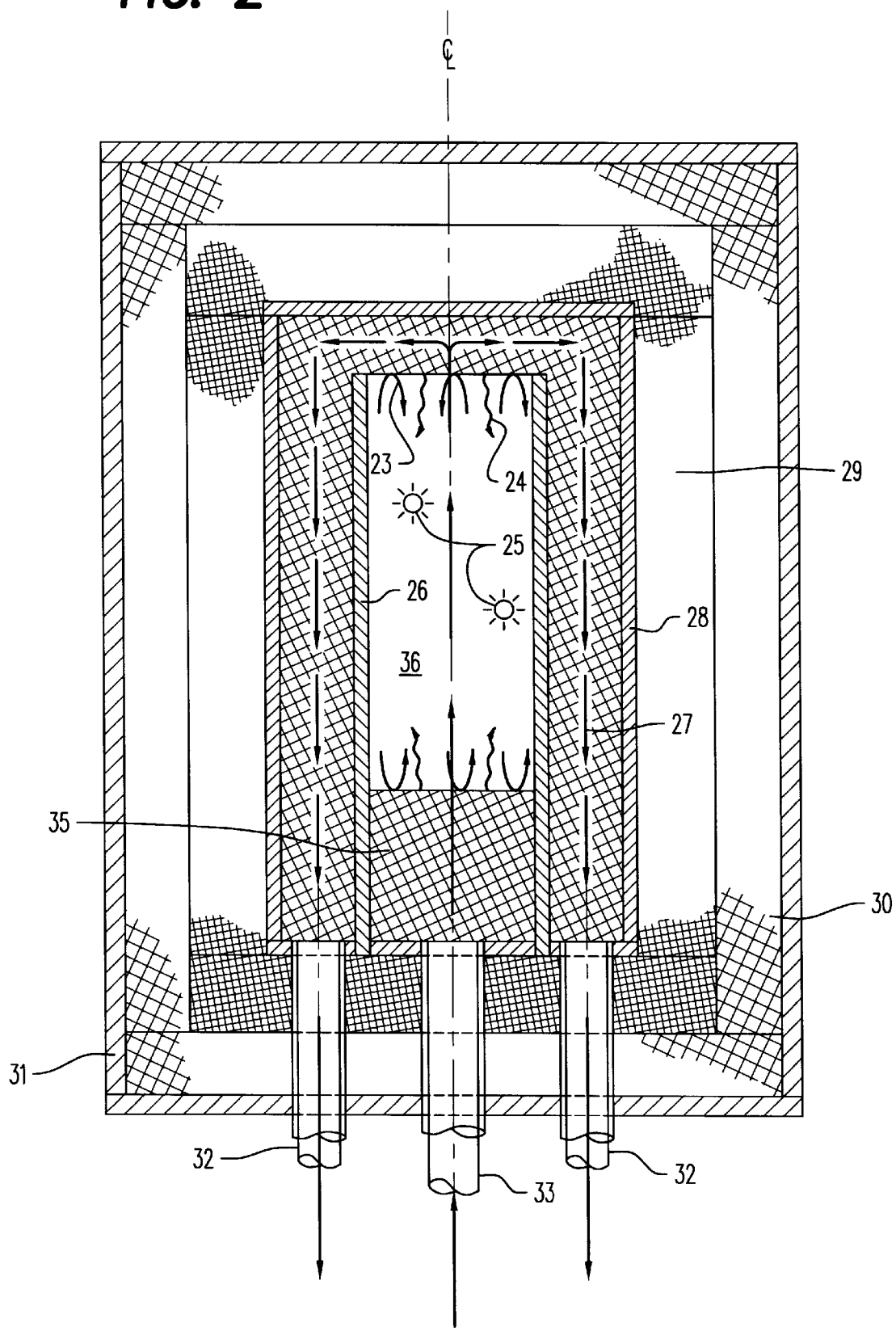
FIG. 2 is a cross section elevation of a reactor where dissociation of $H_2S$ occurs.

With reference to FIG. 1, new gaseous waste feed 10 that typically contains about 90% hydrogen sulfide ($H_2S$) and of 10% carbon dioxide ($CO_2$), water vapor and hydrocarbons enters an input stream mixer 100. The mixed stream from the waste stream mixer is directed to and preheated in a first heat exchanger 200 and in a second heat exchanger 300. The mixed waste stream is typically preheated to between 100° C. and 300° C. in the first heat exchanger and to between 500° C. and 700° C. in the second heat exchanger. This preheating decreases the specific energy required for dissociation of $H_2S$. After preheating, the stream is directed to a thermoelectric reactor 400 in which temperatures up to 1900° C. are attained and where the $H_2S$ is dissociated by means of thermal destruction of its chemical bonds. Such high temperatures along with rapid reaction rates can be achieved in a well-insulated thermoelectric reactor by means of thermal radiation enhancement, energy trapping, and electromagnetic hydrodynamics (EMHD) as taught in the applicant's U.S. Pat. No. 5,614,156, entitled, "Ultra-Pyrolysis Reactor for Hazardous Waste Destruction". In this thermoelectric reactor, as shown in FIG. 2, the preheated waste stream enters a well insulated reaction chamber 36 containing electric infrared energy sources, such as resistant heating elements 23. The electric energy sources are shaped to create non-equilibrium EMHD and plasma conditions. A turbulent mixing zone 35 and energy retaining zone 27 containing porous ceramic fibers, and zones containing high-temperature fiber blankets 30 and high-temperature vacuum form fibers 29 provide insulation for the reaction chamber. Heat is trapped and enhanced by radiation in the reaction chamber to sustain high temperatures and in combination with the non-equilibrium EMHD conditions, a high dissociation efficiency is achieved.

The $H_2S$ in the stream that enters the reactor 400 is dissociated there as elemental sulfur in a vapor state and as hydrogen. The dissociated product stream may also contain the impurities from the gas feed ($CO_2$, CO, COS, $CS_2$) as well as unconverted $H_2S$. The hydrocarbons are destroyed in the reactor as $CO_2$, CO, and $H_2O$. A high-temperature dissociated gas/vapor stream leaves the reactor and is directed to the second heat exchanger 300 where its temperature is lowered through transferring heat to preheat the stream directed to the reactor 400.

A cooled gas/vapor stream leaves the second heat exchanger and is directed to a condenser 500, such as an expansion chamber, where the temperature of the gas/vapor stream is further cooled down to between 250° C. and 440° C. This temperature range is below the boiling point of sulfur, 444.6° C., so that a condensed sulfur stream will leave the expansion chamber/condenser; however, it is high enough to keep the condensed sulfur within the flowing regime, that is a liquid. The condensed liquid sulfur is directed to a sulfur receiver 510. Some micron-sized mists or aerosols nucleated in the condenser will be carried over by gases that were not condensed in the expansion chamber/condenser. To minimize sulfur aerosols being carried over, aerosol-bearing non condensible gases leaving the expansion chamber/condenser enters a first demister 600. After leaving the first demister, the aerosol or mist-bearing non-condensible gases are directed to a sulfur scrubber 700 to remove potential trace amounts of sulfur remaining after leaving the first demister. In the sulfur scrubber, sulfur aerosols are absorbed by a water spray. Water is well suited to be an absorbent as well as to create effective absorbent conditions. It is inexpensive; it will not be a problem if it is vaporized; because of its high heat of vaporization, it is effective in reducing the temperature of the gas stream entering the sulfur scrubber to improve the efficiency of compressor 800; and it may convert impurities (such as CO, COS, and $CS_2$) into useful or benign gases such as $H_2O$, $H_2$, or $CO_2$. Carbon monoxide or methane react with water to produce hydrogen. The $H_2S$ produced from the reaction of COS with water can be recycled to produce more hydrogen and elemental sulfur.

The sulfur-containing solution (mainly water) is collected and stored in a container 710. A portion of the sulfur-containing solution from container 710 is recycled by pump 720 back into the sulfur scrubber by using a sprayer 730 in the ceiling or walls of the sulfur scrubber. The temperature of the non-condensible gases in the scrubber is between 120° C. and 250° C. To further protect downstream components from sulfur plugging and erosion, a second demister 610 may be placed at the outlet of sulfur scrubber 700. This second demister would provide an additional safeguard to reduce the trace amounts of liquid sulfur and water that could be carried over to downstream components. The non-condensible gas stream leaving the second demister is directed to the first heat exchanger 200 where it is cooled to between 60° C. and 120° C. to enhance its compressibility. It is then directed to a compressor 800 where the cooled non-condensible gas stream is compressed. With a view to effectively purifying, or separating out the hydrogen, the pressure across the compressor is increased to 2 atmospheres or above. The compressed gas stream is directed to a membrane-separator or purifier 900 where it is separated into three streams: a hydrogen stream 910; a $CO_2/H_2O$ stream 920; and a $H_2S$ stream 930. This $H_2S$ stream is recycled back to the input stream mixer 100 where it mixes with new waste feed 10.

EMHD conditions in the thermoelectric reactor 400 speed and enhance $H_2S$ dissociation activity. Such dissociation activity can be initiated, prompted and further enhanced if ionizing gases or other seed material are in the stream that enters the reactor 400. Therefore, ionizing gases or seed material 20 is preferably mixed with the new gaseous waste feed and the recycle $H_2S$ stream in the input stream mixer 100. To prevent the ionizing gases or seed material from reacting with $H_2S$, $S_2$, or $H_2$, or other material present in the streams in the system, the ionizing gases should be a noble gas, such as argon or helium, and the seed materials should be a sulfur-containing alkali or alkaline earth salt such as potassium sulfide ($K_2S$), sodium sulfide ($Na_2S$), calcium sulfide (CaS), potassium sulfate ($K_2SO_4$), sodium sulfate ($Na_2SO_4$), calcium sulfate ($CaSO_4$) or other materials that do not readily react with sulfur compounds or hydrogen.

I claim:

1. A process for recovering elemental sulfur and hydrogen from a gaseous waste stream containing hydrogen sulfide comprising the following steps:

preheating a gaseous stream in a plurality of heat exchangers, including a first heat exchanger and a second heat exchanger, said gaseous stream including the gaseous waste stream containing hydrogen sulfide;

feeding the gaseous stream preheated in the heat exchangers to a thermoelectric reactor, heating the preheated gaseous stream to temperatures between 1000° C. and 1900° C. in the thermoelectric reactor with use of energy sources, and thereby dissociating hydrogen sulfide in the preheated gaseous stream and forming a vapor product stream containing elemental sulfur and hydrogen;

cooling the vapor product stream from the thermoelectric reactor in the second heat exchanger;

feeding the cooled product stream from the second heat exchanger to a condenser means further cooling it to a temperature between 250° C. and 440° C., and condensing elemental sulfur vapor to liquid sulfur, and leaving an aerosol-laden vapor stream;

collecting liquid sulfur from the condenser means in a sulfur receiver;

directing the aerosol-laden vapor stream from the condenser means to a first demister and then to a sulfur scrubber and removing sulfur from the vapor stream leaving the condenser means and first demister by absorbing said sulfur in a water spray, storing the water with absorbed sulfur inn a container, and recycling and spraying a portion of the water with sulfur absorbed back into the sulfur scrubber;

directing the vapor stream leaving the sulfur scrubber to a second demister;

directing the vapor stream leaving the second demister to the first heat exchanger and cooling the stream leaving the sulfur scrubber to a temperature range of 60° C. to 120° C. in the first heat exchanger;

directing the cooled vapor stream leaving the first heat exchanger to a compressor and compressing the cooled vapor stream to a pressure of two atmospheres or more;

separating the compressed, cooled vapor stream in a membrane separator into a hydrogen gas stream; a carbon dioxide and water vapor stream; and hydrogen sulfide vapor stream;

mixing the hydrogen sulfide vapor stream from the membrane separator with the gaseous waste stream containing hydrogen sulfide prior to preheating in the plurality of heat exchangers.

2. A process for recovering elemental sulfur and hydrogen as set forth in claim 1 wherein the thermoelectric reactor comprises electric energy sources in a well-insulated reaction chamber, the energy sources being shaped for causing electromagnetic hydrodynamic and plasma conditions, the reaction chamber trapping energy and causing dissociation of hydrogen sulfide.

3. A process for recovering elemental sulfur and hydrogen as set forth in claim 2 further comprising mixing the mixture of the hydrogen sulfide vapor stream from the membrane separator with the gaseous waste stream containing hydrogen sulfide prior to preheating in the plurality of heat exchangers with a noble gas capable of being ionized to initiate and promote ionization in the thermoelectric reactor.

4. A process for recovering elemental sulfur and hydrogen as set forth in claim 2 further comprising mixing the mixture of the hydrogen sulfide vapor stream from the membrane separator with the gaseous waste stream containing hydrogen sulfide prior to preheating in the plurality of heat exchangers with an ionization-promoting sulfur-containing salt to initiate and promote ionization in the thermoelectric reactor.

5. A process for recovering elemental sulfur and hydrogen as set forth in claim 4 wherein the sulfur-containing salt is an alkali salt or an alkaline earth salt.

6. A process for recovering elemental sulfur and hydrogen as set forth in claim 1 further comprising mixing the mixture of the hydrogen sulfide vapor stream from the membrane separator with the gaseous waste stream containing hydrogen sulfide prior to preheating in the plurality of heat exchangers with a noble gas capable of being ionized and with an ionization-promoting sulfur-containing salt to initiate and promote ionization in the thermoelectric reactor.

7. A process for recovering elemental sulfur and hydrogen as set forth in claim 6 wherein the sulfur-containing salt is an alkali salt or an alkaline earth salt.

* * * * *